(12) United States Patent
Rohr et al.

(10) Patent No.: US 12,401,221 B2
(45) Date of Patent: Aug. 26, 2025

(54) MULTIPHASE-TO-SINGLE-PHASE AUTOMATIC TRANSFER SWITCH

(71) Applicant: SCHNEIDER ELECTRIC IT CORPORATION, Foxboro, MA (US)

(72) Inventors: Daniel J. Rohr, Wildwood, MO (US); Kevin M. Kemper, Lake Saint Louis, MO (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 78 days.

(21) Appl. No.: 18/544,776

(22) Filed: Dec. 19, 2023

(65) Prior Publication Data

US 2025/0202275 A1 Jun. 19, 2025

(51) Int. Cl.
*H02J 9/06* (2006.01)

(52) U.S. Cl.
CPC .............. *H02J 9/068* (2020.01); *H02J 9/061* (2013.01)

(58) Field of Classification Search
CPC .................................. H02J 9/068; H02J 9/061
USPC ........................................................... 307/23
See application file for complete search history.

(56) References Cited

U.S. PATENT DOCUMENTS

| | | | |
|---|---|---|---|
| 4,761,563 A * | 8/1988 | Ross | H02J 9/066 307/64 |
| 7,064,458 B2 | 6/2006 | Wittner | |
| 7,762,786 B2 | 7/2010 | Taylor et al. | |
| 7,928,604 B2 | 4/2011 | Page | |
| 9,467,006 B2 | 10/2016 | Dickerson et al. | |
| 9,996,128 B2 | 6/2018 | Chapel et al. | |
| 10,601,246 B2 | 3/2020 | Ding et al. | |
| 10,742,030 B2 | 8/2020 | Sharifipour | |
| 10,840,735 B1 | 11/2020 | Cooper | |
| 10,928,878 B2 | 2/2021 | Morales et al. | |
| 10,985,603 B2 | 4/2021 | Tomassi | |
| 11,211,816 B1 | 12/2021 | Bose et al. | |

(Continued)

FOREIGN PATENT DOCUMENTS

| | | | |
|---|---|---|---|
| EP | 2672603 A1 | 12/2013 | |
| EP | 2665346 B1 | 7/2019 | |

(Continued)

OTHER PUBLICATIONS

Extended European Search Report from corresponding European Application No. 24218991.8 dated May 19, 2025.

*Primary Examiner* — Richard Tan
(74) *Attorney, Agent, or Firm* — Lando & Anastasi, LLP

(57) ABSTRACT

Examples of the disclosure include an automatic transfer switching system comprising a first input to receive phases of first power from a first source, a second input to receive phases of second power from a second source, a receptacle, a phase-selection interface (PSI) configured to receive the first power and output a first selected phase and receive the second power and output a second selected phase, a switching device coupled to the receptacle and the PSI, and at least one controller configured to control the switching device to couple the first input to the receptacle via the PSI to provide the first selected phase when the switching device decouples the second input from the receptacle, and to control the switching device to couple the second input to the receptacle via the PSI to provide the second selected phase when the switching device decouples the first input from the receptacle.

20 Claims, 8 Drawing Sheets

(56) References Cited

U.S. PATENT DOCUMENTS

2005/0141154 A1 6/2005 Consadori et al.
2012/0078428 A1 3/2012 Hendrieckx
2022/0247304 A1* 8/2022 Oudrhiri ................... G06F 1/30

FOREIGN PATENT DOCUMENTS

WO 2015094290 A1 6/2015
WO 2022162415 A1 8/2022

* cited by examiner

MULTIPHASE-TO-SINGLE-PHASE AUTOMATIC TRANSFER SWITCH

BACKGROUND

1. Field of the Disclosure

At least one example in accordance with the present disclosure relates generally to power-transfer systems.

2. Discussion of Related Art

Server racks in data centers may use large amounts of power. Some server racks may be connected to multiple main-power sources. If power becomes unavailable from one main-power source, the server rack may switch to drawing power from another main-power source.

SUMMARY

According to at least one aspect of the present disclosure, an automatic transfer switching (ATS) system is provided comprising a first input configured to receive multiple phases of first power from a first power source, a second input configured to receive multiple phases of second power from a second power source, a receptacle configured to provide power to one or more loads, at least one phase-selection interface configured to receive the multiple phases of first power from the first power source and selectively output a first selected phase of the first power chosen from among the multiple phases of the first power, and receive the multiple phases of second power from the second power source and selectively output a second selected phase of the second power chosen from among the multiple phases of the second power, at least one switching device coupled to the receptacle and to the at least one phase-selection interface, and at least one controller configured to control the at least one switching device to provide power to the receptacle, wherein controlling the at least one switching device to provide power to the receptacle includes controlling the at least one switching device to couple the first input to the receptacle via the at least one phase-selection interface to provide the first selected phase to the receptacle when the at least one switching device decouples the second input from the receptacle, and controlling the at least one switching device to couple the second input to the receptacle via the at least one phase-selection interface to provide the second selected phase to the receptacle when the at least one switching device decouples the first input from the receptacle.

In at least one example, the at least one switching device includes a first switch and a second switch, the first switch being configured to selectively couple the receptacle to the first input and the second switch being configured to selectively couple the receptacle to the second input. In at least one example, the first switch is in a closed state when the first switch couples the first input to the receptacle, the second switch is in a closed state when the second switch couples the second input to the receptacle, the first switch is in an open state when the first switch decouples the first input from the receptacle, and the second switch is in an open state when the second switch decouples the second input from the receptacle.

In at least one example, the at least one phase-selection interface includes a phase selection switch configured to selectively couple at least one phase input of the first input to the receptacle, the at least one phase input being configured to receive at least one phase of the multiple phases of first power from a power source. In at least one example, the at least one phase-selection interface includes a phase selection switch configured to selectively couple at least one phase input of the first input to the at least one switching device, the at least one phase input being configured to receive at least one phase of the multiple phases of first power from a power source. In at least one example, the at least one phase-selection interface includes a phase selection switch configured to selectively couple at least one phase input of the second input to the receptacle, the at least one phase input being configured to receive at least one phase of the multiple phases of second power from a power source.

In at least one example, the at least one phase-selection interface includes a phase selection switch configured to selectively couple at least one phase input of the second input to the at least one switching device, the at least one phase input being configured to receive at least one phase of the multiple phases of second power. In at least one example, the at least one phase-selection interface is configured to switch from outputting the first selected phase of the first power to outputting a third selected phase of the first power, the third selected phase chosen from among the multiple phases of the first power. In at least one example, the at least one phase-selection interface is configured to switch from outputting the second selected phase of the second power to outputting a third selected phase of the second power, the third selected phase chosen from among the multiple phases of the second power.

In at least one example, the ATS system includes a multiphase rectifier configured to receive power from one of the first input or the second input, and a converter coupled to the multiphase rectifier and configured to receive power from the multiphase rectifier, process power received from the multiphase rectifier into processed power, and provide the processed power to the at least one controller. In at least one example, a first total number of the multiple phases of first power equals a second total number of the multiple phases of second power, and the ATS system further comprises at least one respective receptacle for each respective phase of first power, and at least one respective switching device for each respective phase of first power.

Aspects of the disclosure include a method of transferring power automatically using a switching system having a first input, a second input, at least one phase-selection interface, at least one switching device, and a receptacle, the method comprising receiving, at the first input, first power having multiple phases from a first power source, receiving, by the at least one phase-selection interface, the multiple phases of first power, selecting, by the at least one phase-selection interface, a first selected phase of first power from the multiple phases of first power, outputting, by the at least one phase-selection interface, the first selected phase of first power to the at least one switching device, receiving, at the second input, second power having multiple phases from a second power source, receiving, by the at least one phase-selection interface, the multiple phases of second power, selecting, by the at least one phase-selection interface, a second selected phase of second power from the multiple phases of second power, outputting, by the at least one phase-selection interface, the second selected phase of second power to the at least one switching device, receiving, by the at least one switching device, the first selected phase of first power and the second selected phase of second power, and providing, by the at least one switching device, one of the first selected phase of first power or the second selected phase of second power to the receptacle by coupling one of the first input or the second input to the receptacle while decoupling the other of the first input or the second input from the receptacle.

In at least one example, the method includes providing, by the at least one switching device, the first selected phase of first power to the receptacle. In at least one example, the method includes providing, by the at least one switching device, the second selected phase of second power to the receptacle. In at least one example, the method includes decoupling, by the at least one switching device, the receptacle from the first input responsive to determining that the first power provided via the first input connection falls outside a range of acceptable voltage or current values. In at least one example, the method includes decoupling, via the at least one switching device, the receptacle from the second input responsive to determining that the second power received at the second input connection falls outside of a range of acceptable voltage or current values.

Aspects of the disclosure include at least one non-transitory computer-readable medium containing thereon instructions executable by at least one processor for controlling an automatic transfer switching system having a first input to receive multiple phases of first power, a second input to receive multiple phases of second power, at least one phase-selection interface to receive the multiple phases of first power and the multiple phases of second power, at least one switching devices, and a receptacle, the instructions instructing the at least one processor to select a first selected phase of power chosen from among the multiple phases of the first power, select a second selected phase of power chosen from among the multiple phases of the second power, control the at least one phase-selection interface to output the first selected phase of power from the multiple phases of first power received by the at least one phase-selection interface, and output the second selected phase of power from the multiple phases of second power received by the at least one phase-selection interface, and control the at least one switching device to provide power to the receptacle, wherein controlling the at least one switching device to provide power to the receptacle includes controlling the at least one switching device to couple the first input to the receptacle to provide the first selected phase of power to the receptacle when the at least one switching device decouples the second input from the receptacle, and controlling the at least one switching device to couple the second input to the receptacle to provide the second selected phase of power to the receptacle when the at least one switching device decouples the first input from the receptacle.

In at least one example, the instructions further instruct the at least one processor to switch from providing the first selected phase of power to providing the second selected phase of power by controlling the at least one switching device to decouple the first input from the receptacle and couple the second input to the receptacle. In at least one example, the instructions further instruct the at least one processor to control the at least one switching device to decouple the receptacle from the first input responsive to determining that the first power falls outside a range of acceptable voltage or current values. In at least one example, the instructions further instruct the at least one processor to control the at least one switching device to decouple the receptacle from the second input responsive to determining that the second power falls outside a range of acceptable voltage or current values.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
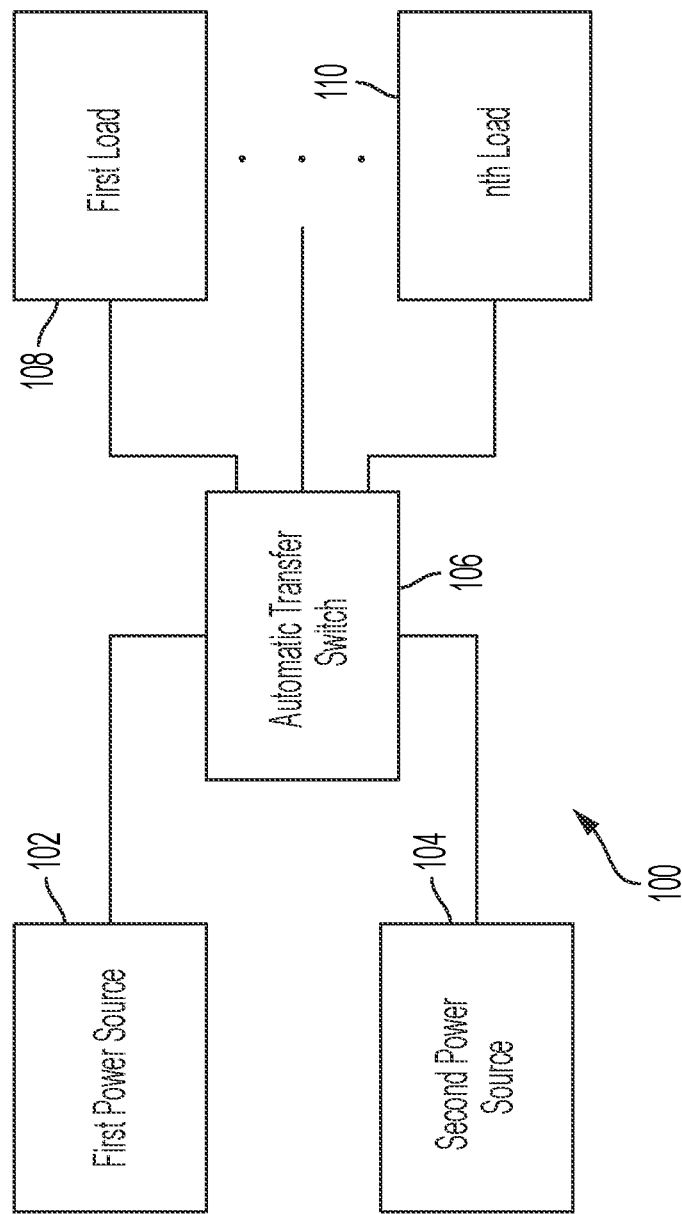
FIG. 1 illustrates a block diagram of a power system according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Power sources may provide power to one or more loads. In some power-intensive applications, the loads that draw power may receive power from more than one power source. Power distribution units (PDUs) may route power from the power sources to the loads. PDUs may include automatic transfer switches that automatically switch between power sources based on a given criterion or set of criteria. In many examples, the power sources will provide alternating current (AC) power having multiple phases. However, providing multiple phases of power to multiple loads simultaneously can pose challenges. For example, ensuring that the loads are balanced across the multiple phases may be important, since imbalances may affect the quality of the power received by the loads. Furthermore, an overloaded phase of power may trip a circuit breaker. For example, a multi-pole circuit breaker conducting multi-phase power may trip on all poles (corresponding to all phases of power) if any of the poles of the circuit breaker are overloaded.

As an example, consider a data center where multiple servers are operating simultaneously and therefore drawing power simultaneously. If an AC power source provides three phases of power, but all of the servers are using only the first phase of power, power distribution may be imbalanced. Such a power imbalance may place a substantial strain on the AC power source during provision of the first phase of power, but relatively little strain during provision of the other two phases of power. Under these circumstances, the servers may not operate at a desired level of performance. In some cases, the servers may even shut down if, for example, a circuit breaker is tripped by an overloaded phase of power.

In some examples disclosed herein, a phase selection system incorporated into an automatic transfer switch or other power system may receive a multi-phase-power input and output single-phase power. Each of the single phases may be output via a respective power receptacle. The receptacles may be grouped such that, if loads are connected to the receptacles in order, power is balanced between the multiple phases. In various examples, a phase selection system may be capable of routing any of the multiple phases of the multi-phase-power input to any of the single-phase receptacles. Accordingly, examples of the disclosure provide a multiphase-to-single-phase power device capable of routing any of the multiple phases to any of the single-phase receptacles.

Continuing with the example of the data center, in some situations an AC power source may lose power or may be unable to provide acceptable power to the servers. For example, the servers may draw more power than the maximum total output of the AC power source. As a result, the servers may not be receiving acceptable power and may even shut down.

In some examples disclosed herein, a power source selection system incorporated into an automatic transfer switch or other power system may be used to select between multiple power sources to provide power to the loads. For example, if a power source cannot provide acceptable power, the power source selection system may switch some or all of the loads from the power source to another power source. Likewise, if a power source fails, the power source selection system may switch to the other power source to allow some or all of the loads to continue operation.

FIG. 1 illustrates a power system 100 according to an example. The power system 100 includes a first power source 102, a second power source 104, an automatic transfer switch 106 ("ATS 106"), and an arbitrary number of n loads including a first load 108 and an nth load 110. The ATS 106 is configured to route power from the first power source 102 and/or second power source 104 to the n loads, including the first load 108 and the nth load 110. The ATS 106 can determine which phase of power from the first power source 102 and/or second power source 104 is provided to the n loads, including the first load 108 and the nth load 110, and may determine which of the first power source 102 and second power source 104 provides the power to a given load. Thus, the ATS 106 can dynamically determine the phase and source of the power provided to a given load.

The first power source 102 is coupled to the ATS 106. The second power source 104 is coupled to the ATS 106. The first power source 102 and/or second power source 104 may include AC power sources, such as mains utility sources. The first load 108 is coupled to the ATS 106. The nth load 110 is coupled to the ATS 106. The first load 108 and/or nth load 110 may include power-consuming devices such as computer servers, cooling units, and so forth. One or more additional loads may also be coupled to the ATS 106. Likewise, in some examples, the ATS 106 may be coupled to more than two power sources.

The first power source 102 is configured to provide the multiple phases of first power to the ATS 106. The second power source 104 is configured to provide the multiple phases of second power to the ATS 106.

The ATS 106 is configured to route power from one of the first power source 102 and second power source 104 to a given load. The ATS 106 is further configured to determine which phase of the first power and which phase of the second power is provided to a given load. For example, with respect to the first load 108, the ATS 106 may determine whether to provide the first load 108 with power from the first power source 102 or from the second power source 104, and may also determine which phase of the first power or the second power to provide to the first load 108. The ATS 106 may make the same determinations with respect to every load coupled to the ATS 106, including the nth load 110.

The ATS 106 may be further configured to dynamically and/or selectively switch the phases of power provided to a given load or the source of the power provided to a given load. For example, with respect to the first load 108, the ATS 106 may initially provide a first phase of first power to the first load 108, but could change the power provided to the first load 108 to a different phase of the first power or to any phase of second power. The ATS 106 may perform the same operations with respect to every other load, including the nth load 110.

The first load 108 and the nth load 110, as well as any other loads coupled to the ATS 106, may be electronic devices and/or equipment that draw power and use the power to perform functions. In some examples, the loads, including the first load 108 and the nth load 110, may be servers, computers, or other devices capable of performing processing operations.

Figure 2:
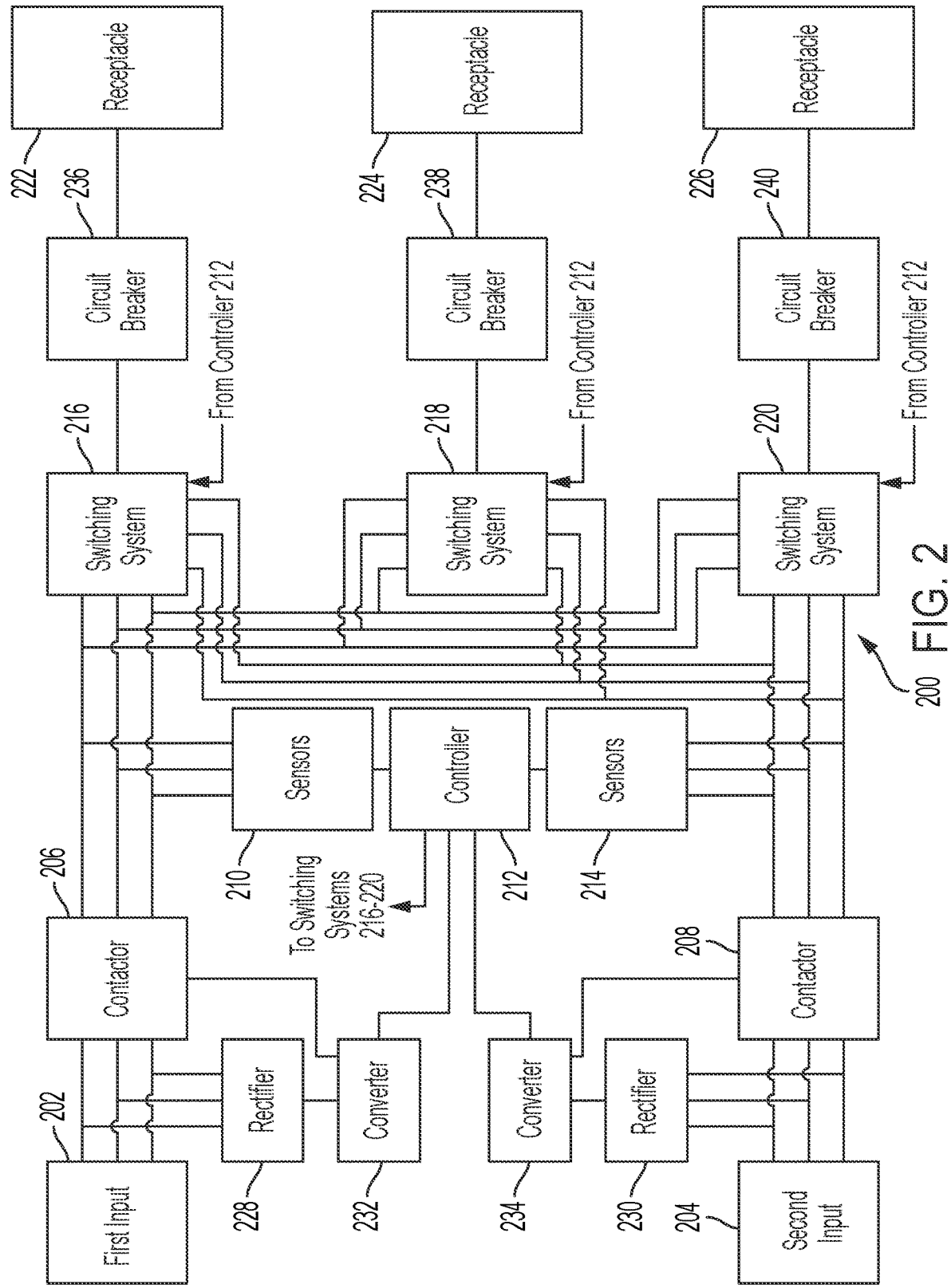
FIG. 2 illustrates a block diagram of a power distribution unit according to an example.

FIG. 2 illustrates a block diagram of an automatic transfer switch 200 ("ATS 200") according to an example. The ATS 200 may be an example of the ATS 106 of FIG. 1. The ATS 200 is configured to dynamically and/or selectively determine the phase and source of power provided at a given receptacle, each of which may be coupled to a respective one of the n loads. The ATS 200 includes a first input 202, a second input 204, a first contactor 206, a second contactor 208, one or more first sensors 210 ("first sensor 210"), at least one controller 212 ("controller 212"), one or more second sensors 214 ("second sensor 214"), a first switching system 216, a second switching system 218, a third switching system 220, a first receptacle 222, a second receptacle 224, a third receptacle 226, a first rectifier 228, a second rectifier 230, a first converter 232, a second converter 234, a first circuit breaker 236, a second circuit breaker 238, and a third circuit breaker 240. As illustrated, the ATS 200 is configured to receive power from three-phase power sources. Other examples may be configured to receive any number of phases of power.

The first input 202 is coupled to the first contactor 206 and to the first rectifier 228. The first input 202 may be configured to receive three phases of first power. As a result, a first-phase first-power (that is, a first phase of first power) connection (or "first phase input") of the first input 202 may be coupled to a respective connection of the first contactor 206 and of the first rectifier 228, a second-phase first-power connection (or "second phase input") of the first input 202 may be coupled to a respective connection of the first contactor 206 and of the first rectifier 228, and a third-phase first-power connection (or "third phase input") of the first input 202 may be coupled to a respective connection of the first contactor 206 and of the first rectifier 228.

The second input 204 is coupled to the second contactor 208 and to the second rectifier 230. The second input 204 may be configured to receive three phases of second power. As a result, a first-phase second-power (that is, a first phase of second power) connection (or "fourth phase input") of the second input 204 may be coupled to a respective connection of the second contactor 208 and of the second rectifier 230, a second-phase second-power connection (or "fifth phase input") of the second input 204 may be coupled to a respective connection of the second contactor 208 and of the second rectifier 230, and a third-phase second-power connection (or "sixth phase input") of the second input 204 may be coupled to a respective connection of the second contactor 208 and of the second rectifier 230.

The first contactor 206 is coupled to the first switching system 216, the second switching system 218, the third switching system 220, and the first converter 232. The first contactor 206 may have connections for providing the first, second, and third phases of first power to the switching systems. As a result, a first-phase first-power connection of the first contactor 206 may be coupled to a respective connection of the first switching system 216, a respective connection of the second switching system 218, and a respective connection of the third switching system 220. A second-phase first-power connection of the first contactor 206 may be coupled to a respective connection of the first switching system 216, a respective connection of the second switching system 218, and a respective connection of the third switching system 220. A third-phase first-power connection of the first contactor 206 may be coupled to a respective connection of the first switching system 216, a respective connection of the second switching system 218, and a respective connection of the third switching system 220. The first contactor 206 may be energized by the first converter 232, which dictates the switching state (for example, open and non-conducting if the first contactor 206 is not energized or closed and conducting if the first contactor 206 is energized) of the first contactor 206.

The second contactor 208 is coupled to the first switching system 216, the second switching system 218, the third switching system 220, and the second converter 234. The second contactor 208 may have connections for providing the first, second, and third phases of second power to the switching systems. As a result, a first-phase second-power connection of the second contactor 208 may be coupled to a respective connection of the first switching system 216, a respective connection of the second switching system 218, and a respective connection of the third switching system 220. A second-phase second-power connection of the second contactor 208 may be coupled to a respective connection of the first switching system 216, a respective connection of the second switching system 218, and a respective connection of the third switching system 220. A third-phase second-power connection of the second contactor 208 may be coupled to a respective connection of the first switching system 216, a respective connection of the second switching system 218, and a respective connection of the third switching system 220. The second contactor 208 may be energized by the second converter 234, which dictates the switching state (for example, open and non-conducting if the second contactor 208 is not energized or closed and conducting if the second contactor 208 is energized) of the second contactor 208.

The first sensor 210 may be coupled to one or more connections between the first contactor 206 and the first switching system 216, the second switching system 218, and/or the third switching system 220. In some examples, the first sensor 210 may include a first sensor (for example, a current sensor) coupled in series between the first contactor 206 and the first switching system 216, a second sensor coupled in series between the first contactor 206 and the second switching system 218, and/or a third sensor coupled in series between the first contactor 206 and the third switching system 220. In various examples, the first sensor 210 may include one or more sensors (for example, voltage sensors) coupled to at least one of a connection between the first contactor 206 and the first switching system 216, a connection between the first contactor 206 and the second switching system 218, and/or a connection between the first contactor 206 and the third switching system 220. The first sensor 210 is also coupled to the controller 212.

The second sensor 214 may be coupled to one or more connections between the second contactor 208 and the first switching system 216, the second switching system 218, and/or the third switching system 220. In some examples, the second sensor 214 may include a first sensor (for example, a current sensor) coupled in series between the second contactor 208 and the first switching system 216, a second sensor coupled in series between the second contactor 208 and the second switching system 218, and/or a third sensor coupled in series between the second contactor 208 and the third switching system 220. In various examples, the second sensor 214 may include one or more sensors (for example, voltage sensors) coupled to at least one of a connection between the second contactor 208 and the first switching system 216, a connection between the second contactor 208 and the second switching system 218, and/or a connection between the second contactor 208 and the third switching system 220. The second sensor 214 is also coupled to the controller 212.

The first switching system 216 is coupled to the first contactor 206 and the second contactor 208. In some examples, the first switching system 216 has three independent connections to the first contactor 206 (one for each phase of first power), and three independent connections to the second contactor 208 (one for each phase of second power). The first switching system 216 is also coupled to the first receptacle 222 via the first circuit breaker 236.

The second switching system 218 is coupled to the first contactor 206 and the second contactor 208. In some examples, the second switching system 218 has three independent connections to the first contactor 206 (one for each phase of first power), and three independent connections to the second contactor 208 (one for each phase of second power). The second switching system 218 is also coupled to the second receptacle 224 via the second circuit breaker 238.

The third switching system 220 is coupled to the first contactor 206 and the second contactor 208. In some examples, the third switching system 220 has three independent connections to the first contactor 206 (one for each phase of first-power), and three independent connections to the second contactor 208 (one for each phase of second-power). The third switching system 220 is also coupled to the third receptacle 226 via the third circuit breaker 240.

The first rectifier 228 is coupled to, and is configured to receive power from, the first input 202 at a plurality of input connections. The first rectifier 228 is also coupled to the first converter 232 at an output connection. The first rectifier 228 may be configured to receive one or more phases of AC power from the first input 202, to rectify the AC power, and to provide a single rectified DC output to the first converter 232. If power is not available from at least one phase at the first input 202, then the first rectifier 228 may not provide power to the first converter 232. If power is available from at least one phase at the first input 202, then in some examples the first rectifier 228 may provide rectified output power to the first converter 232 even if one or more other phases of power are not available at the first input 202.

The second rectifier 230 is coupled to, and is configured to receive power from, the second input 204 at a plurality of input connections. The second rectifier 230 is also coupled to the second converter 234 at an output connection. The second rectifier 230 may be configured to receive one or more phases of AC power from the second input 204, to rectify the AC power, and to provide a single rectified DC output to the second converter 234. If power is not available from at least one phase at the second input 204, then the second rectifier 230 may not provide power to the second converter 234. If power is available from at least one phase at the second input 204, then in some examples the second rectifier 230 may provide rectified output power to the second converter 234 even if one or more other phases of power are not available at the second input 204.

The first converter 232 is coupled to the first rectifier 228 at an input, and is coupled to the first contactor 206 and the controller 212 at respective outputs. The first converter 232 receives power from the first rectifier 228, converts the received power, and provides converted power to the first contactor 206 and the controller 212. For example, the first converter 232 may be a DC/DC converter configured to adjust a voltage level of the received power. The power provided from the first converter 232 to the first contactor 206 energizes the first contactor 206 and causes the first contactor 206 to close and conduct. If the first converter 232 does not energize the first contactor 206 (for example, because power is unavailable from the first input 202), then the first contactor 206 remains open and non-conducting.

The second converter 234 is coupled to the second rectifier 230 at an input, and is coupled to the second contactor 208 and the controller 212 at respective outputs. The second converter 234 receives power from the second rectifier 230, converts the received power, and provides converted power to the second contactor 208 and the controller 212. For example, the second converter 234 may be a DC/DC converter configured to adjust a voltage level of the received power. The power provided from the second converter 234 to the second contactor 208 energizes the second contactor 208 and causes the second contactor 208 to close and conduct. If the second converter 234 does not energize the second contactor 208 (for example, because power is unavailable from the second input 204), then the second contactor 208 remains open and non-conducting.

The contactors 206, 208, in combination with the rectifiers 228, 230 and the converters 232, 234, prevent backfeed when the inputs 202, 204 are not energized by power sources. The contactors 206, 208 are open and non-conducting (and thus isolate the inputs 202, 204 from the remainder of the ATS 200) unless power is available at the inputs 202, 204 to energize the contactors 206, 208. When the contactors 206, 208 are energized, then the contactors 206, 208 may be closed and conducting. Otherwise, if the contactors 206, 208 are not energized (for example, because power is unavailable at the inputs 202, 204, respectively), then the contactors 206, 208 are open and non-conducting. The open contactors 206, 208 isolate the inputs 202, 204 from the rest of the ATS 200. This isolation may prevent backfeed to the inputs 202, 204 from other parts of the ATS 200.

The first input 202 is configured to receive three phases of first power. That is, the first input 202 is configured to be coupled to a first power source (for example, the first power source 102) configured to provide three phases of first power. The first input 202 is configured to provide each phase of first power to the first contactor 206.

The second input 204 is configured to receive three phases of second power. That is, the second input 204 is configured to be coupled to a second power source (for example, the second power source 104) configured to provide three phases of second power. The second input 204 is configured to provide each phase of second power to the second contactor 208.

The first contactor 206 is configured to receive the phases of first power from the first input 202, and relay those phases of power to the first switching system 216, the second switching system 218, and/or the third switching system 220. The first contactor 206 may also operate as a switching device (for example, a relay, dip-switch, limit switch, transistor-based switch, and so forth) to control whether any or all phases of first power are provided to the switching systems, including the first switching system 216, the second switching system 218, and/or the third switching system 220. For example, in the event of an overcurrent condition affecting the first phase of the first power, the first contactor 206 could stop providing the first phase of the first power to the rest of a system (for example, the first switching system 216, the second switching system 218, and/or the third switching system 220, and the first sensor 210). In the event of an overcurrent condition affecting additional phases of the first power, the first contactor 206 may stop providing those additional phases of power to a system as well. In general, the first contactor 206 may stop providing any phases of the first power from the rest of the ATS 200.

The second contactor 208 is configured to receive the phases of second power from the second input 204, and relay those phases of power to the first switching system 216, the second switching system 218, and/or the third switching system 220. The second contactor 208 may also operate as a switching device (for example, a relay, dip-switch, limit switch, transistor-based switch, and so forth) to control whether any or all phases of second power are provided to the switching systems, including the first switching system 216, the second switching system 218, and/or the third switching system 220. For example, in the event of an overcurrent condition affecting the first phase of second power, the second contactor 208 could stop providing the first phase of second power to the rest of the system (for example, to the first switching system 216, the second switching system 218, the third switching system 220, and/or and the second sensor 214). In the event of an overcurrent condition affecting additional phases of second power, the second contactor 208 could stop providing those additional phases to the system as well. In general, the second contactor 208 may stop providing any phases of the second power from the rest of the ATS 200.

The first sensor 210 is configured to sense one or more characteristics of the phases of the first power. Characteristics of power may generally include voltage, current, phase, frequency, period, harmonic content, and so forth. The first sensor 210 may include more than one sensor, and/or may include multiple sensor connections. Thus, the first sensor 210 may independently monitor the first phase of first power, the second phase of the first power, and/or the third phase of the first power, and may include multiple (for example, three) sensors to perform the monitoring.

The second sensor 214 is configured to sense one or more characteristics of the phases of the second power. Characteristics of power may generally include voltage, current, phase, frequency, period, harmonic content, and so forth. The second sensor 214 may include more than one sensor, and/or may include multiple sensor connections. Thus, the second sensor 214 may independently monitor the first phase of second power, the second phase of the second power, and/or the third phase of the second power, and may include multiple (for example, three) sensors to perform the monitoring.

In various examples, the first switching system 216, the second switching system 218, and/or the third switching system 220 are each configured to select between phases of power and sources of power. Each of the first switching system 216, the second switching system 218, and/or the third switching system 220 is configured to provide output power to a respective receptacle.

The first switching system 216 is configured to provide first output power to the first receptacle 222 via the first circuit breaker 236. The second switching system 218 is configured to provide second output power to the second receptacle 224 via the second circuit breaker 238. The third switching system 220 is configured to provide third output power to the third receptacle 226 via the third circuit breaker 240. The first output power, second output power, and third output power may each be single-phase power. Each of the circuit breakers 236-240 may trip (that is, transition from being closed and conducting to being open and non-conducting) if a current conducted by the respective circuit breaker exceeds a current rating. For example, if the current through the first circuit breaker 236 exceeds the current rating of the first circuit breaker 236, then the first circuit breaker 236 may trip and thereby disconnect the first switching system 216 from the first receptacle 222.

Each of the first switching system 216, the second switching system 218, and/or the third switching system 220 may be configured to provide a single phase of first power or a single phase of second power to a respective one of the first receptacle 222, second receptacle 224, and/or third receptacle 226. The first switching system 216 may be configured to provide the first phase of the first power or the first phase of the second power, the second phase of the first power or the second phase of the second power, or the third phase of the first power or the third phase of the second power to the first receptacle 222. The second switching system 218 may be configured to provide the first phase of the first power or the first phase of the second power, the second phase of the first power or the second phase of the second power, or the third phase of the first power or the third phase of the second power to the second receptacle 224. The third switching system 220 may be configured to provide the first phase of the first power or the first phase of the second power, the second phase of the first power or the second phase of the second power, or the third phase of the first power or the third phase of the second power to the third receptacle 226. More generally, each of the first switching system 216, the second switching system 218, and/or the third switching system 220 may freely and independently output any given phase of the first power or the second power. Accordingly, each of the first receptacle 222, second receptacle 224, and/or third receptacle 226 may receive output power derived from a different phase or different source compared to any other receptacle.

In at least one example, however, each of the first switching system 216, the second switching system 218, and/or the third switching system 220 may output, to a respective one of the first receptacle 222, second receptacle 224, and/or third receptacle 226, power from the same source but with a different phase. For example, the first switching system 216 may provide a first phase of the first power to the first receptacle 222; the second switching system 218 may provide a second phase of the first power to the second receptacle 224; and the third switching system 220 may provide a third phase of the first power to the third receptacle 226.

In another example, the first switching system 216 may provide a first phase of the second power to the first receptacle 222; the second switching system 218 may provide a second phase of the second power to the second receptacle 224; and the third switching system 220 may provide a third phase of the second power to the third receptacle 226.

In yet another example, the first switching system 216 may provide a second phase of the first power to the first receptacle 222; the second switching system 218 may provide a third phase of the first power to the second receptacle 224; and the third switching system 220 may provide a first phase of the first power to the third receptacle 226. The first switching system 216, the second switching system 218, and/or the third switching system 220 will be discussed in further detail with respect to FIG. 4.

The first receptacle 222 is configured to provide first output power to a first load connected to the first receptacle 222 (for example, the first load 108). The second receptacle 224 is configured to provide second output power to a second load. The third receptacle 226 is configured to provide third output power to a third load. The receptacles may include, for example, electrical outlets configured to provide power to a connected load. The controller 212 is configured to control the first switching system 216, the second switching system 218, and/or the third switching system 220, the first contactor 206 and/or second contactor 208, and/or the first sensor 210 and/or second sensor 214. The controller 212 may also be configured to communicate with loads and/or power sources (for example, the first power source 102, second power source 104, and/or any of the n loads including the first load 108 and/or nth load 110). The controller 212 may determine whether the first contactor 206 and/or second contactor 208 should be in an open state or a closed state and control the first contactor 206 and/or second contactor 208 accordingly. The controller 212 may further determine a desired power source and power phase to provide to the first receptacle 222, second receptacle 224, and/or third receptacle 226, and may control the first switching system 216, the second switching system 218, and/or the third switching system 220 accordingly.

The ATS 200 generally operates as follows. Power may be received at the inputs 202, 204 from the power sources 102, 104, respectively. If power is available at the inputs 202, 204, then the contactors 206, 208 are energized by the power received at the inputs 202, 204. The contactors 206, 208 close in response to being energized and provide power to the switching systems 216-220. If power is not available at one of the inputs 202, 204, then the corresponding one of the contactors 206, 208, respectively, is not energized and remains open. For example, if acceptable power is not available at the first input 202, then the first contactor 206 remains open.

Each of the switching systems 216-220 receives power from one or both of the contactors 206, 208. Each switching system 216-220 selects one of the inputs 202, 204 to draw power from. If power is only available from one of the inputs 202, 204, then the switching systems 216-220 draw power only from that input. If power is available from both of the inputs 202, 204, then the switching systems 216-220 may default to drawing power from a preferred one of the inputs 202, 204. Either of the inputs 202, 204 may be arbitrarily selected as a preferred input. For example, the first input 202 may arbitrarily be selected as a preferred input. In this example, the switching systems 216-220 preferably draw power from the first input 202 if power is available from both of the inputs 202, 204. The controller 212 may control the switching systems 216-220 to switch to drawing power from the second input 204 if acceptable power is no longer available at the first input 202.

The selected power source may provide multiple phases of power. The controller 212 may decide which phase of power is to be provided to the receptacles 222-226. For example, if the first input 202 provides three-phase power with phases L1a, L2a, and L3a, then the controller 212 may control each of the switching systems 216-220 to provide a selected one of these three phases to a respective receptacle. Each of the switching systems 216-220 may provide the same or a different phase of power to a respective one of the receptacles 222-226. For example, the first switching system 216 may provide phase L1a to the first receptacle 222, the second switching system 218 may provide phase L2a to the second receptacle 224, and the third switching system 220 may provide phase L3a to the third receptacle 226.

Accordingly, the controller 212 may control the switching systems 216-220 to route any phase of power from any power source to any one of the receptacles 222-226. The controller 212 may control the switching systems 216-220 to switch power sources if, for example, a selected power source is no longer able to provide acceptable power. The controller 212 may control the switching systems 216-220 to switch which phase of power is provided to the receptacles 222-226 to, for example, balance the load across the phases. The ATS 200 may therefore provide redundant three-to-single-phase power while dynamically balancing power drawn across multiple phases.

Figure 3:
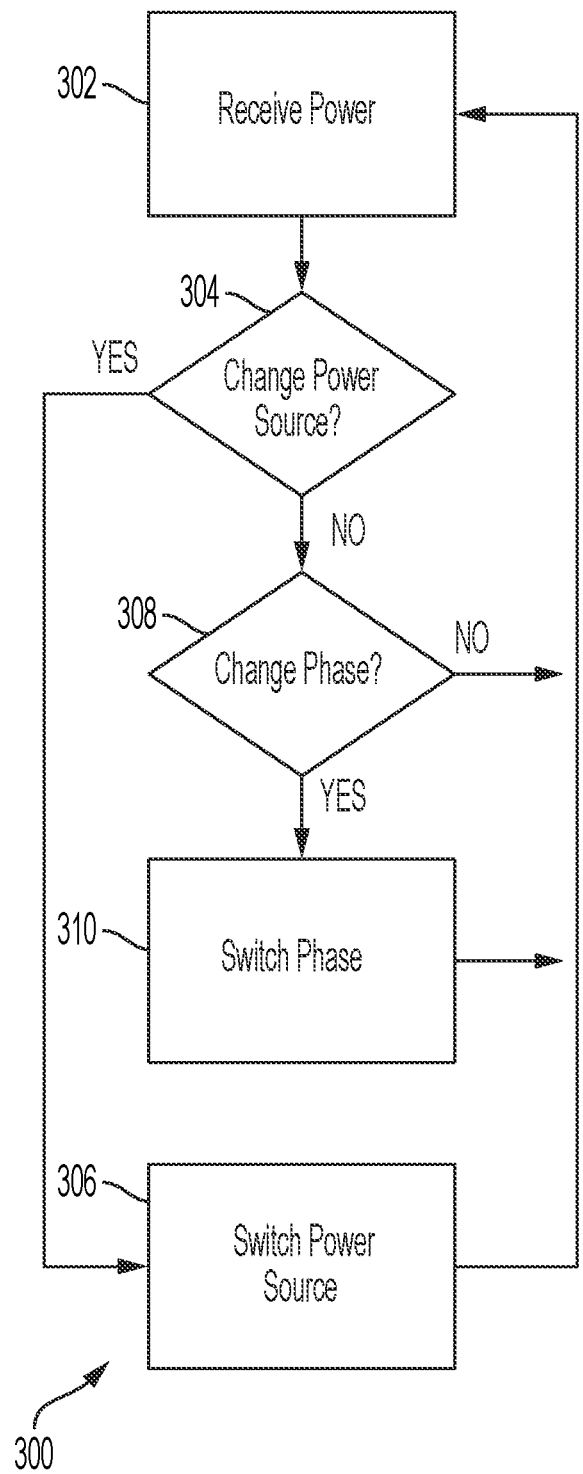
FIG. 3 illustrates a flowchart of a process for determining the source and phase of power according to an example.

FIG. 3 illustrates a process 300 for determining the source and phase of power to provide to a load according to an example. For example, the loads may include loads coupled to the receptacles 222-226. Over the course of operation of the ATS 200, the source of the power may be switched from one power supply to another. For example, the source of power may be switched from the first input 202 (which may be coupled to the first power source 102) to the second input 204 (which may be coupled to the second power source 104). Likewise, the phase of power provided to the load may be adjusted, for example, to maintain a balanced distribution of loads across numerous phases of power. For example, the phase of power may be adjusted from a first of three phases of three-phase power received at the first input 202 to a second of three phases of three-phase power received at the first input 202.

For purposes of example, the process 300 is described as beginning after the controller 212 has determined which phases of power to provide to respective loads, and the ATS 200 is providing those respective phases of power to the respective loads. As discussed below, the controller 212 may thus have controlled or be controlling the switching systems 216-220 to establish desired source-to-load conductive paths from the first input 202 and/or the second input 204 to the receptacles 222-226.

At act 302, the inputs 202, 204 receive power from the power sources 102, 104, respectively. The contactors 206, 208 may close responsive to being energized by the power sources 102, 104. Power is therefore provided from the inputs 202, 204 to the switching systems 216-220 via the contactors 206, 208. The controller 212 monitors power characteristics of the power provided by the first power source 102 and/or the second power source 104 to the receptacles 222-226. The controller 212 may receive power-characteristic information indicative of the power characteristics (for example, a voltage, a current, and so forth) from the sensors 210, 214. Because act 302 is executed after the controller 212 has previously determined which phases of power to provide to which of the receptacles 222-226, the controller 212 may be capable of correlating the power-characteristic information to each source-to-receptacle connection. For example, the controller 212 may be capable of determining the source and phase of the power provided to each of the receptacles 222-226 and may have access to power-characteristic information for each. The process 300 may continue to act 304.

At act 304, the controller 212 determines whether to change the power source providing power to one or more of the loads. For example, the controller 212 may determine whether the power quality provided to at least one load ("the loads") is acceptable for the load. The controller 212 may determine whether the power quality is acceptable for the loads based on one or more criteria. For example, the controller 212 may determine whether the characteristics of the power (for example, voltage, current, phase, frequency, period, harmonic content, and so forth) determined at act 302 fall within a certain range or ranges of values. As an example, suppose the loads requires power provided at 50 A of current, with a tolerance of +/−1 A. The power quality may be acceptable if the current of the power is within a range of 49 to 51 A, but may not be acceptable if the power is provided outside that range. Characteristics may be required (to be considered acceptable) to fall within a given range, or to be above or below a threshold value.

The controller 212 may determine, in addition or alternatively to determining whether the characteristics of the power are acceptable, whether one power source is under undue strain. Undue strain may include the difference in power provided by one power source compared to another exceeding a threshold percentage or magnitude. For example, a power source (such as the first power source 102) may be providing power to a larger number of the loads and/or providing power to loads that consume substantially more power as compared to another power source (such as the second power source 104). Act 304 may therefore include the controller 212 determining whether the difference in power provided by the power sources 102, 104 exceeds a threshold amount (such as a threshold amount of power or a threshold difference in power) or falls outside a target range).

In various examples, the controller 212 may determine whether the power provided by a power source is acceptable based on the characteristics of the power, the distribution of power consumption between the power sources (such as the power sources 102, 104), the number of loads drawing power from the power sources, and/or so forth. That is, the controller 212 may transfer a given load to a given power source based on the power quality, and/or to more evenly distribute the number of loads across the power sources, and/or to more evenly distribute the power consumption of loads across the power sources, and so forth. In various examples, the controller 212 may not switch every load of the loads to a new power source. In some examples, the controller 212 may allow some of the one or more loads of the loads to continue receiving power from the original power source, for example, because the power quality improves, the power sources become balanced, or the strain is alleviated (for example, by the transfer of other loads to the other power sources).

If the controller 212 determines that the power quality is acceptable (304 YES), the process 300 may continue to act 308. If the controller 212 determines that the power quality is not acceptable (304 NO), the process 300 may continue to act 306.

At act 306, the controller 212 may control a respective switching system (for example, the switching systems 216-220) to change a power source that is providing power to one or more respective loads. The controller 212 may transfer the one or more loads from a first power source (for example, the first power source 102) to a second power source (for example, the second power source 104). The controller 212 may control a switching system (for example, the first switching system 216) to change from one power source to another by controlling a phase-selection interface of the switching system to switch from drawing power from a power source and/or input to a different power source and/or input. The process 300 may return to act 302.

The process 300 may then return to act 304. If the controller 212 determines at act 304 that a power source is not to be changed (304 YES), then the process 300 continues to act 308.

At act 308, the controller 212 determines whether to change the phase of power provided to the loads. The controller 212 may determine whether the one or more phases of the power provided to the loads are acceptable for the load, and may determine to change the phase of power provided to a given load based on that phase of power being acceptable or not. As with act 304, numerous parameters may be employed to make this determination. The controller 212 may determine whether to change the phase of power provided to one or more loads of the loads based on one or more phase-change criteria.

For example, the controller 212 may determine that the characteristics of the power fall outside a desired range or exceed (or fall below) a given threshold (for example, a current, voltage frequency, or voltage magnitude threshold and/or range). Such a determination may include, for example, the controller 212 determining whether the voltage, frequency, and/or current fall outside of an acceptable range. The controller 212 may also determine whether a given phase of power is under undue strain. A given phase of power may be under undue strain if the difference in power provided by that phase of power compared to another phase of power (for example, from the same power source) exceeds a threshold amount or falls outside of a desired range.

If the controller 212 determines not to change the phase of power (308 NO), the process 300 may continue to act 302. In some examples, returning to act 302 from act 308 may indicate that—at least for the time being—the power source and the phases of power are providing power effectively, such as by having acceptable power characteristics, being evenly distributed, and/or not being under undue strain.

Otherwise, if the controller 212 determines that the phase of power should be changed (308 YES), then the process 300 continues to act 310. In some examples, continuing to act 310 may indicate that it may be desirable to change the phase of power provided to at least one load because, for example, power is not evenly distributed between the phases of a power source. The controller 212 may not switch every load of the loads to a new phase of power. In some examples, the controller 212 may allow some of the one or more loads of the loads to continue receiving the original phase of power, for example, because the power quality improves, the phases become balanced, or the strain is alleviated (for example, by the transfer of other loads to the other phases of power). The controller 212 may determine which phase of power to switch to based on the characteristics of that phase of power, the distribution of power consumption between loads, the number of loads drawing power from a given phase of power, and/or so forth. That is, the controller 212 may transfer a given load to a given phase of power based on the power quality, and/or to more evenly distribute the number of loads across the phases of power, and/or to more evenly distribute the power consumption of loads across the phases of power (that is, reduce undue strain), and/or so forth.

At act 310, the controller 212 controls a phase-selection interface of a switching device to transition one or more loads of the loads from a first phase of power to a different phase of power provided by the same power source as provided the first phase of power. For example, the controller 212 may control a phase-selection interface to switch from providing a first phase of power to providing a second phase of power. The process 300 may continue to act 302.

Figure 4:
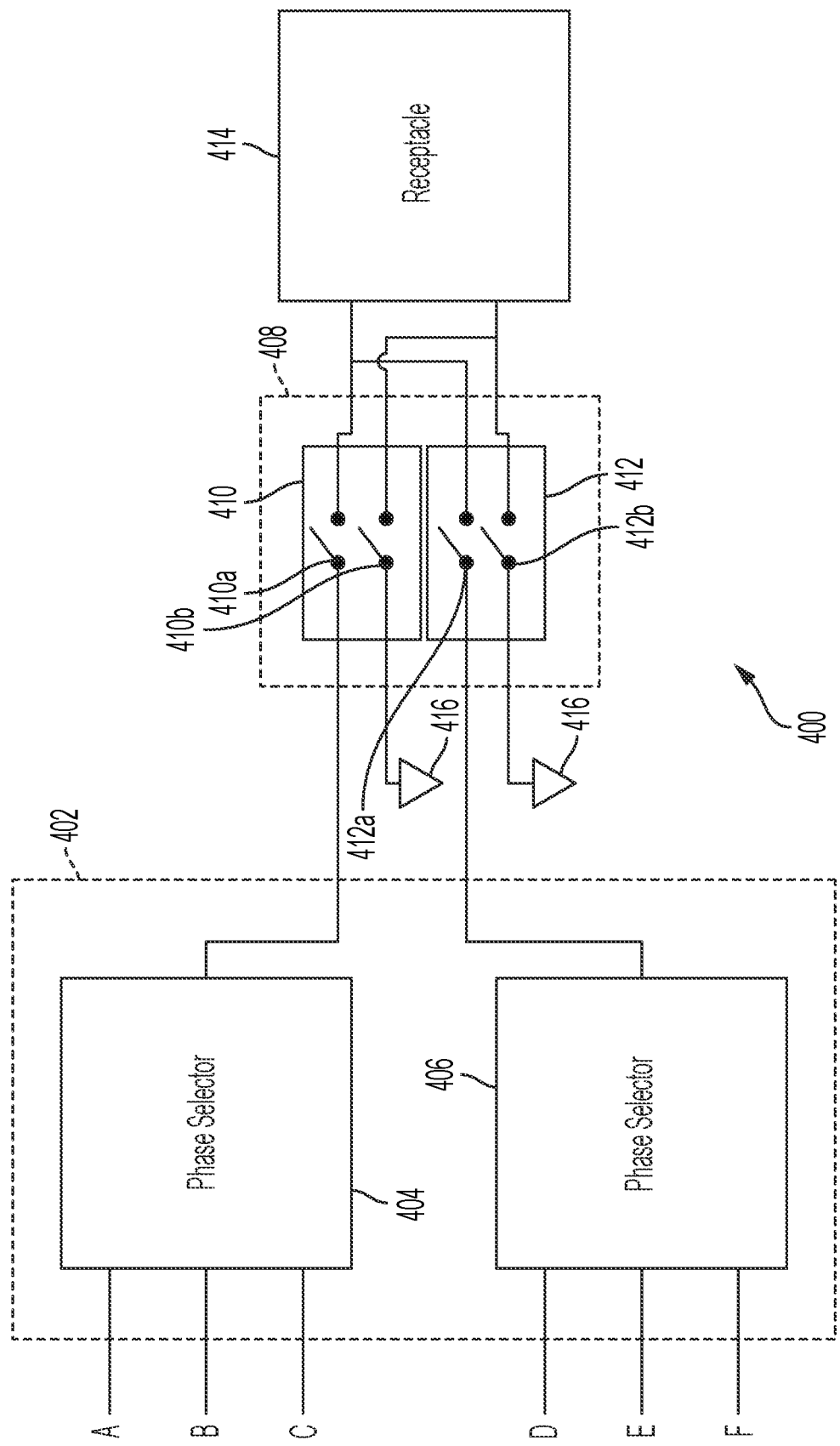
FIG. 4 illustrates a block diagram of a switching system according to an example.

FIG. 4 illustrates a switching system 400 coupled to a receptacle 414 according to an example. The switching system 400 may be one example of an implementation of any of the switching systems 216-220, and the receptacle 414 may be an example of any of the receptacles 222-226. A controller, such as the controller 212, may control the switching system 400 to dynamically and selectively change which power source and which power phase is provided to a load coupled to the receptacle 414, thus allowing the switching system 400 to control the exact phase and source of the power provided at to the receptacle 414.

The switching system 400 includes a phase-selection interface 402 and a switching device 408. The phase-selection interface 402 includes a first phase selector 404 and a second phase selector 406. The switching device 408 includes a first switch 410 and a second switch 412. The first switch 410 includes a first power switch 410a and a first ground switch 410b. The second switch 412 includes a second power switch 412a and a second ground switch 412b. The switching system 400 also includes a reference-voltage connection 416 ("reference connection 416"), which may be coupled to a reference-voltage node, such as a neutral node.

The phase-selection interface 402 is coupled to the switching device 408. The switching device 408 is coupled to the phase-selection interface 402 and is coupled to the receptacle 414. The reference connection 416 is coupled to the switching device 408. In more detail, the first phase selector 404 is coupled to the switching device 408 at a first terminal of the first power switch 410a of the first switch 410. The second phase selector 406 is coupled to the switching device 408 at a first terminal of the second power switch 412a of the second switch 412. The reference connection 416 is coupled to the switching device 408 at a first terminal of the first ground switch 410b of the first switch 410 and at a first terminal of the second ground switch 412b of the second switch 412. The receptacle 414 may have a first connection and a second connection. The first connection of the receptacle 414 may be coupled to the switching device 408 at a second terminal of the first power switch 410a of the first switch 410 and at a second terminal of the second power switch 412a of the second switch 412. The second connection of the receptacle 414 may be coupled to the switching device 408 at a second terminal of the first ground switch 410b of the first switch 410 and at a second terminal of the second ground switch 412b of the second switch 412.

The phase-selection interface 402 is configured to receive one or more phases of power from the first power source 102 and one or more phases of power from the second power source 104. In some examples, the phase-selection interface 402 may receive all available phases of power from both power sources 102, 104. In FIG. 4, the phases of power received from the first power source 102 are labeled A, B, and C, and the phases of power received from the second power source 104 are labeled D, E, and F.

Within the phase-selection interface 402, the first phase selector 404 is configured to receive the A, B, and C phases of first power from the first power source 102, and the second phase selector 406 is configured to receive the D, E, and F phases of second power from the second power source 104. The first phase selector 404 has a single output (connected to the switching device 408 at the first terminal of the first power switch 410a). The first phase selector 404 is configured to route one of the A, B, and C phases of first power to the switching device 408 (for example, at the first power switch 410a) via the output. The second phase selector 406 also has a single output (connected to the switching device 408 at the first terminal of the second power switch 412a). The second phase selector 406 is configured to route one of the D, E, and F phases of the second power to the switching device 408 (for example, to the second power switch 412a) via the output. As discussed in greater detail below with respect to FIGS. 8A and 8B, the first phase selector 404 and the second phase selector 406 may have switching, routing, or other control systems internally to selectively route a given phase of power to the switching device 408 while blocking the other phases of power.

The switching device 408 is configured to select between power derived from the first power source 102 and power derived from the second power source 104 to provide to the receptacle 414. In some examples, the switching device 408 may receive a phase of the first power and a phase of the second power simultaneously, and may route one of those phases to the receptacle 414. For example, if the switching device 408 receives the A phase of power from the first phase selector 404 and the D phase of power from the second phase selector 406, the switching device 408 may route either the A phase of power or the D phase of power to the receptacle 414.

Within the switching device 408, the first switch 410 controls the connection between the first power source 102 and the receptacle 414, and the second switch 412 control the connection between the second power source 104 and the receptacle 414. In particular, the first power switch 410a controls whether the output of the first phase selector 404 is coupled to the receptacle 414. When the first power switch 410a is closed and conducting, the output of the first phase selector 404 is coupled to the receptacle 414. When the first power switch 410a is open and non-conducting, the output of the first phase selector 404 is decoupled from the receptacle 414. The second power switch 412a controls when the output of the second phase selector 406 is coupled to the receptacle 4143. When the second power switch 412a is closed and conducting, the output of the second phase selector 406 is coupled to the receptacle 414. When the second power switch 412a is open and non-conducting, the output of the second phase selector 406 is decoupled from the receptacle 414.

Both the first switch 410 and the second switch 412 contain respective reference-node switches (the first reference-node switch 410b and the second reference-node switch 412b). When either reference-node switch is closed, the receptacle 414 is coupled to the reference connection 416.

The first power switch 410a and first ground switch 410b may be operated in tandem, such that when one is closed the other is also closed, and when one is open the other is also open. Likewise, the second power switch 412a and second ground switch 412b may be operated in tandem, such that when one is closed the other is also closed, and when one is open the other is also open. In some examples, the first switch 410 and second switch 412 may be operated in complementary fashion such that when one is open (and not conducting) the other is closed (and conducting). For example, when the first switch 410 is open the second switch 412 is closed, and when the first switch 410 is closed the second switch 412 is open. In some examples, the first switch 410 and second switch 412 may both be open at the same time.

Figure 5A:
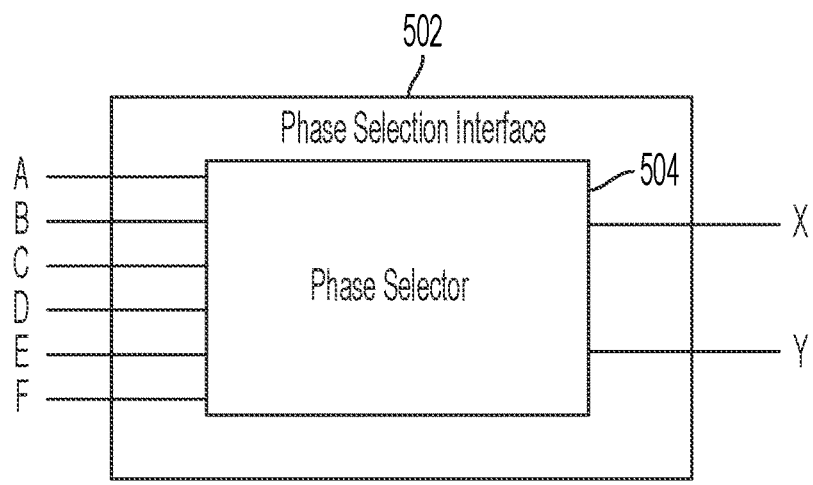
FIG. 5A illustrates a block diagram of a phase-selection interface according to an example.

FIG. 5A illustrates a phase-selection interface 502 according to an example. As will be apparent by comparing the phase-selection interface 502 to the phase-selection interface 402 of FIG. 4, the phase-selection interface 502 has only a single phase selector 504. The phase selector 504 is configured to receive each of the A, B, C, D, E, and F phases of the first power source 102 and the second power source 104. The phase selector 504 is configured to provide one phase of power from among the A, B, C, D, E, and F phases of power at a first output (for example, the "X" output) and one phase of the A, B, C, D, E, and F phases of power at the second output (for example, the "Y" output). In some examples, the A, B, and C phases of power may be provided by a first power source, and the D, E, and F phases of power may be provided by a second power source.

Figure 5B:
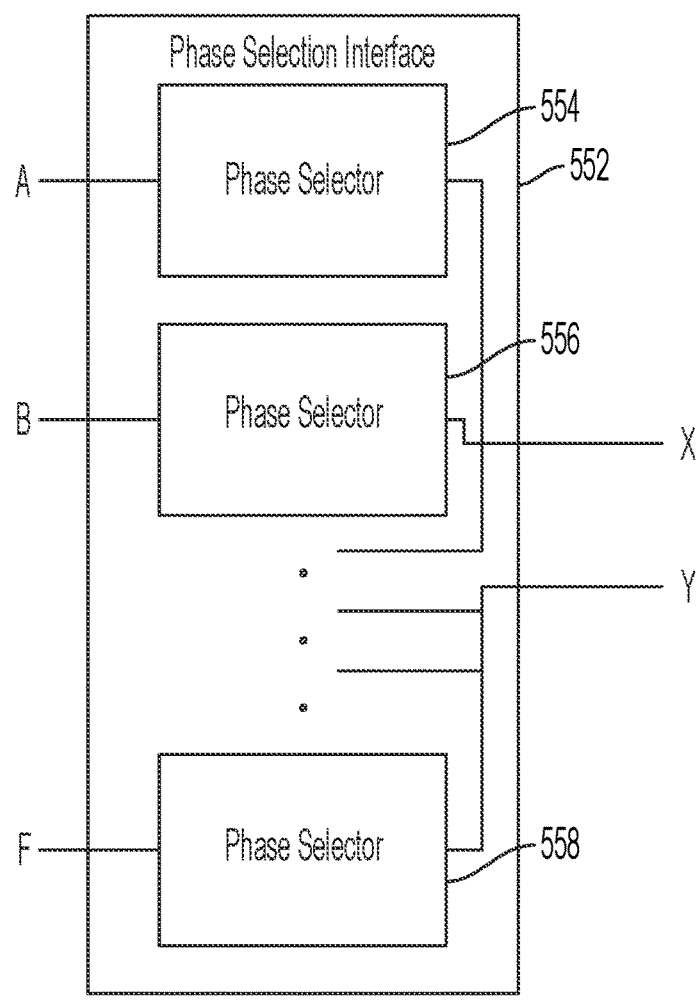
FIG. 5B illustrates a block diagram of a phase-selection interface according to another example.

FIG. 5B illustrates a phase-selection interface 552 according to another example. As will be apparent by comparing the phase-selection interface 552 to the phase-selection interface 402 of FIG. 4, the phase-selection interface 522 has one phase selector for each phase of power (including a first phase selector 554, a second phase selector 556, and a third phase selector 558). Each of the phase selectors 554-558 is configured to receive a single phase of first power or a single phase of second power. For example, the first phase selector 554 is configured to receive the A-phase of the first power, the second phase selector 556 is configured to receive the B-phase of the first power, and the third phase selector 558 is configured to receive the F-phase of the second power. Each phase selector of the phase-selection interface 552 may control whether the phase of received power is available to an output (the "X" and/or "Y" outputs) of the phase-selection interface 552. In some examples, one of the A, B, or C phase of first power may be provided at the X output, and one of the D, E, or F phases of second power may be provided at the Y output.

Accordingly, various implementations of the phase-selection interface 402 are within the scope of the disclosure. The phase-selection interface 402 may include the phase selectors 404 and 406 of FIG. 4, the phase selector 504 of FIG. 5A, the phase selectors 554-558 of FIG. 5B, or may include some other configuration of phase selectors.

Figure 6:
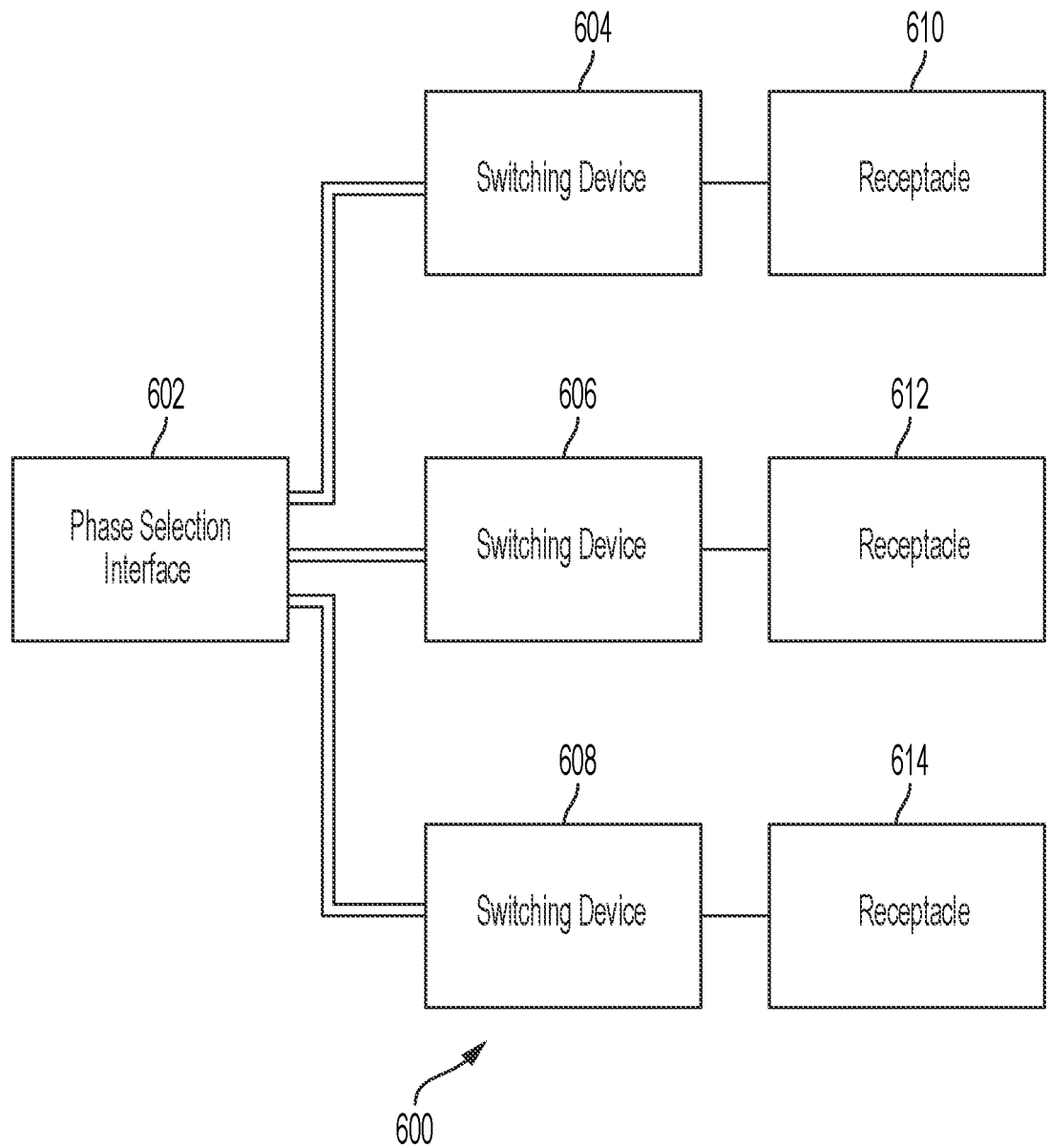
FIG. 6 illustrates a block diagram of a phase-selection interface according to an example.

FIG. 6 illustrates a block diagram of a phase selection topology 600 according to an example. The topology 600 includes a phase-selection interface 602, a first switching device 604, a second switching device 606, a third switching device 608, a first receptacle 610, a second receptacle 612, and a third receptacle 614. In FIG. 6, the phase selection for all of the switching devices 604-608 is handled at the phase-selection interface 602, which provides a respective phase of first power and a respective phase of second power to each of the switching devices 604-608.

The phase-selection interface 602 is coupled to the first switching device 604 via a first connection, is coupled to the second switching device 606 via a second connection, and is coupled to the third switching device 608 via a third connection. The first switching device 604 is coupled to the phase-selection interface 602 at a first connection and is coupled to the first receptacle 610 at a second connection. The second switching device 606 is coupled to the phase-selection interface 602 at a first connection and is coupled to the second receptacle 612 at a second connection. The third switching device 608 is coupled to the phase-selection interface 602 at a first connection and is coupled to the third receptacle 614 at a second connection.

The phase-selection interface 602 is configured to receive each phase of first power and each phase of second power. The phase-selection interface 602 then provides a first phase of first power and a first phase of second power to the first switching device 604, a second phase of first power and a second phase of second power to the second switching device 606, and a third phase of first power and a third phase of second power to the third switching device 608. The first, second, and third phases of first power and second power may be the same phase or different phases.

The first switching device 604 routes the first phase of first power or the first phase of second power to the first receptacle 610. The second switching device 606 routes the second phase of first power or the second phase of the second power to the second receptacle 612. The third switching device 608 routes the third phase of first power or the third phase of second power to the third receptacle 614.

For example, the phase-selection interface 602 may provide both the A phase of first power and the D phase of second power to the first switching device 604. The first switching device 604 may then provide one of either the A phase of first power or the D phase of second power to the first receptacle 610.

The first receptacle 610 provides the phase of power received from the first switching device 604 to a load. The second receptacle 612 provides the phase of power received from the second switching device 606 to a load. The third receptacle 614 provides the phase of power received from the third switching device 608 to a load.

Figure 7:
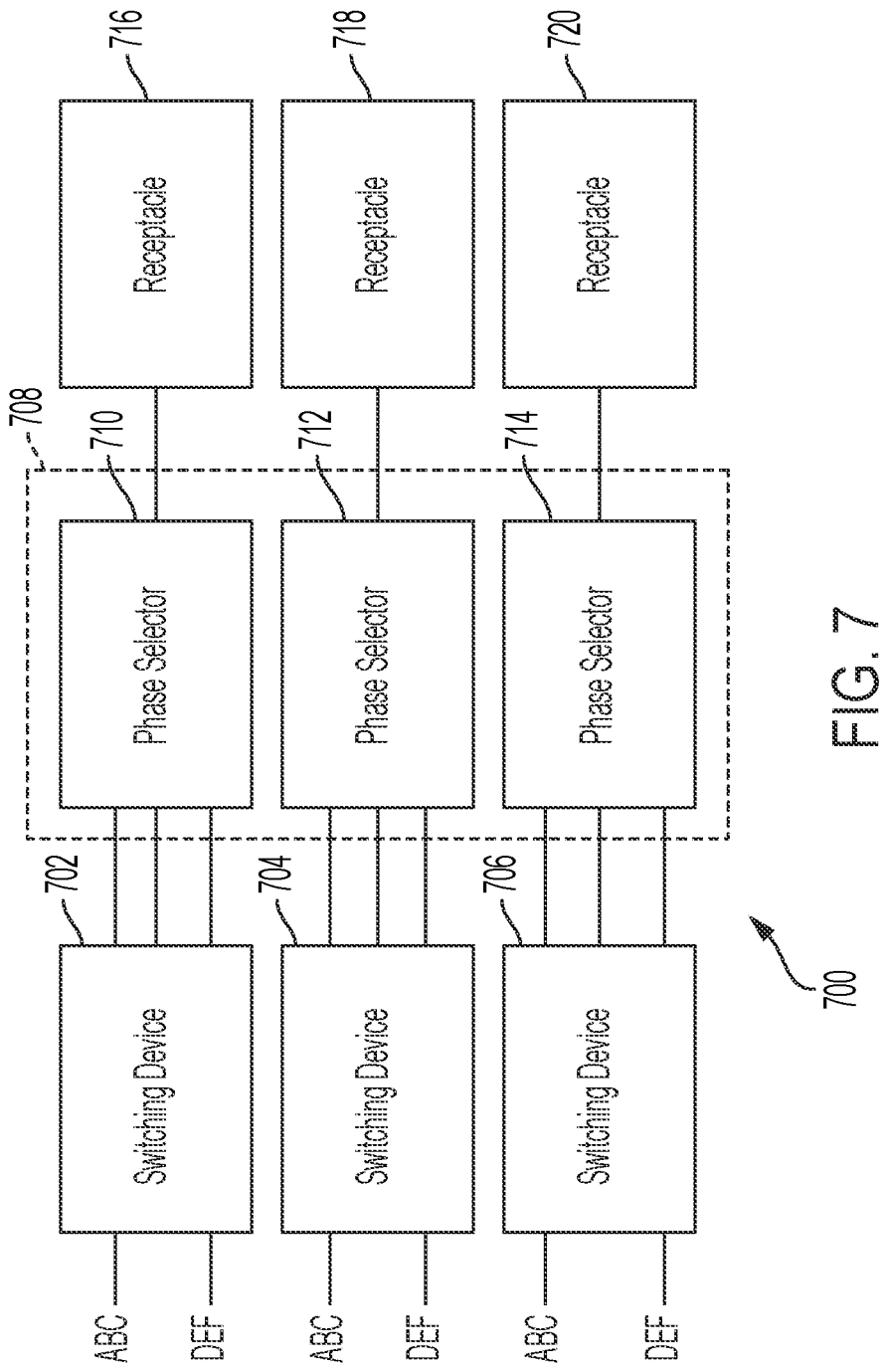
FIG. 7 illustrates a block diagram of a switching system according to an example.

FIG. 7 illustrates a block diagram of a plurality of switching systems 700 ("switching system 700") according to an example. The switching system 700 may be one example of an implementation of any and/or all of the switching systems 216-220.

The switching system 700 includes a first switching device 702, a second switching device 704, a third switching device 706, a phase-selection interface 708, a first receptacle 716, a second receptacle 718, and a third receptacle 720. The phase-selection interface 708 includes a first phase selector 710, a second phase selector 712, and a third phase selector 714.

The first switching device 702 is coupled to the first phase selector 710. In some examples, the first switching device 702 may be coupled to the first phase selector 710 via a first connection, a second connection, and a third connection, where each connection carries a different phase of either the first power or the second power.

The second switching device 704 is coupled to the second phase selector 712. In some examples, the second switching device 704 may be coupled to the second phase selector 712 via a first connection, a second connection, and a third connection, where each connection carries a different phase of either the first power or the second power.

The third switching device 706 is coupled to the third phase selector 714. In some examples, the third switching device 706 may be coupled to the third phase selector 714 via a first connection, a second connection, and a third connection, where each connection carries a different phase of either the first power or the second power.

The first phase selector 710 is further coupled to the first receptacle 716. The second phase selector 712 is further coupled to the second receptacle 718, and the third phase selector 714 is further coupled to the third receptacle 720.

The first switching device 702 is configured to receive each phase of the first power (phases A, B, and C) and each phase of the second power (phases D, E, and F). The first switching device 702 selects between the phases of the first power and the phases of the second power, and provides either the phases A, B, and C of the first power to the first phase selector 710, or provides the phases D, E, and F of the second power to the first phase selector 710.

The second switching device 704 is configured to receive each phase of the first power (phases A, B, and C) and each phase of the second power (phases D, E, and F). The second switching device 704 selects between the phases of the first power and the phases of the second power, and provides either the phases A, B, and C of the first power to the second phase selector 712, or provides the phases D, E, and F of the second power to the second phase selector 712.

The third switching device 706 is configured to receive each phase of the first power (phases A, B, and C) and each phase of the second power (phases D, E, and F). The third switching device 706 selects between the phases of the first power and the phases of the second power, and provides either the phases A, B, and C of the first power to the third phase selector 714, or provides the phases D, E, and F of the second power to the third phase selector 714.

The first phase selector 710 selects one phase from among the phases provided to the first phase selector 710 and provides the chosen phase to the first receptacle 716. The second phase selector 712 selects one phase from among the phases provided to the second phase selector 712 and provides the chosen phase to the second receptacle 718. The third phase selector 714 selects one phase from among the phases provided to the third phase selector 714 and provides the chosen phase to the third receptacle 720.

Accordingly, the switching system 700 may be similar to the switching system 400. For example, each of the switching systems 400, 700 may enable a desired phase of power from a desired power source to be provided to a respective receptacle. However, whereas in FIG. 4 the receptacle 414 is coupled to the switching device 408, in FIG. 7 the first receptacle 716, for example, is coupled to the first phase selector 710 of the phase-selection interface 708. That is, whereas in FIG. 4 the phase-selection interface 402 is upstream of the switching device 408, in FIG. 7 the first switching device 702 is upstream of the phase-selection interface 708. Accordingly, various examples of the switching systems 216-220 are within the scope of the disclosure, and an order of components may be rearranged between different examples.

Figure 8A:
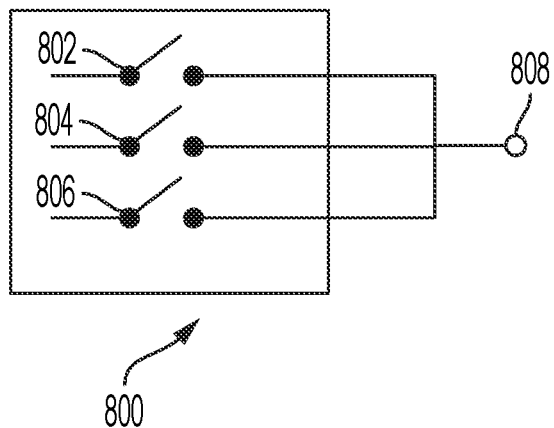
FIG. 8A illustrates a schematic diagram of a switching topology according to an example.

FIG. 8A illustrates a schematic diagram of a first switching topology 800 according to an example. The first switching topology 800 may represent an implementation of any of various phase-selection interfaces, phase selectors, and/or switching devices discussed herein. For example, the first switching topology 800 may represent an example implementation of either of the phase selectors 404, 406, or any of the phase selectors 710-714.

The first switching topology 800 includes a first phase-selection switch 802 ("first switch 802"), a second phase-selection switch 804 ("second switch 804"), a third phase-selection switch 806 ("third switch 806"), and an output 808. Each of the phase-selection switches 802-806 may be communicatively coupled to a controller, such as the controller 212. The first switch 802 may be configured to receive a first phase of power, the second switch 804 may be configured to receive a second phase of power, and the third switch 806 may be configured to receive a third phase of power. When the first switch 802 is closed, the first phase of power is provided to the output 808 via the conducting path created by the closed state of the first switch 802. Likewise, when the second switch 804 is closed, the second phase of power is provided to the output 808. When the third switch 806 is closed, the third phase of power is provided to the output 808. When any of the switches 802-806 is open, the respective switch(es) does not provide power to the output 808. Each switch may be opened or closed independently. However, in some examples, when one switch is closed the other two switches are open. For example, if the first switch 802 is closed (such that the first phase of power is provided to the output 808), the second switch 804 and the third switch 806 may be open.

Figure 8B:
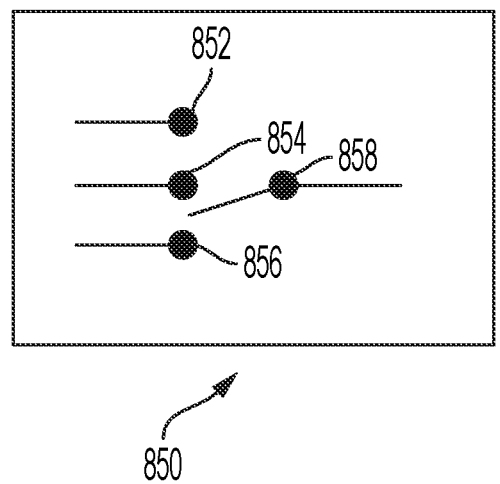
FIG. 8B illustrates a schematic diagram of a switching topology according to another example.

FIG. 8B illustrates a schematic diagram of a second phase-selection switch topology 850 ("second switching topology 850") according to another example. The second switching topology 850 may represent an implementation of any of various phase-selection interfaces, phase selectors, and/or switching devices discussed herein. For example, the second switching topology 850 may represent an example implementation of either of the phase selectors 404, 406, or any of the phase selectors 710-714.

The second switching phase-selection switch topology 850 is an example of a single-pole triple-throw switch. The second switching topology 850 includes a first terminal 852, a second terminal 854, a third terminal 856, and a pole 858. The first terminal 852 may be configured to receive a first phase of power, the second terminal 854 may be configured to receive a second phase of power, and the third terminal 856 may be configured to receive a third phase of power. The second switching topology 850 may be coupled to a controller (for example, the controller 212) configured to control a switching state of the second switching topology 850.

For example, the controller 212 may control the second switching topology 850 such that the pole 858 is coupled to one of the terminals 852-856. The second switching topology 850 may therefore perform a similar function as the first switching topology 800, albeit with a different structure.

Various controllers, such as the controller 212, may execute various operations discussed above. Using data stored in associated memory and/or storage, the controller 212 also executes one or more instructions stored on one or more non-transitory computer-readable media, which the controller 212 may include and/or be coupled to, that may result in manipulated data. In some examples, the controller 212 may include one or more processors or other types of controllers. In one example, the controller 212 is or includes at least one processor. In another example, the controller 212 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. An automatic transfer switching (ATS) system comprising:
    a first input configured to receive multiple phases of first power from a first power source;
    a second input configured to receive multiple phases of second power from a second power source;
    a receptacle configured to provide power to one or more loads;
    at least one phase-selection interface configured to:
        receive the multiple phases of first power from the first power source and selectively output a first selected phase of the first power chosen from among the multiple phases of the first power, and
        receive the multiple phases of second power from the second power source and selectively output a second selected phase of the second power chosen from among the multiple phases of the second power;
    at least one switching device coupled to the receptacle and to the at least one phase-selection interface; and
    at least one controller configured to control the at least one switching device to provide power to the receptacle, wherein controlling the at least one switching device to provide power to the receptacle includes:
        controlling the at least one switching device to couple the first input to the receptacle via the at least one phase-selection interface to provide the first selected phase to the receptacle when the at least one switching device decouples the second input from the receptacle, and controlling the at least one switching device to couple the second input to the receptacle via the at least one phase-selection interface to provide the second selected phase to the receptacle when the at least one switching device decouples the first input from the receptacle.

2. The ATS system of claim 1 wherein the at least one switching device includes a first switch and a second switch, the first switch being configured to selectively couple the receptacle to the first input and the second switch being configured to selectively couple the receptacle to the second input.

3. The ATS system of claim 2 wherein:
the first switch is in a closed state when the first switch couples the first input to the receptacle;
the second switch is in a closed state when the second switch couples the second input to the receptacle;
the first switch is in an open state when the first switch decouples the first input from the receptacle; and
the second switch is in an open state when the second switch decouples the second input from the receptacle.

4. The ATS system of claim 1 wherein the at least one phase-selection interface includes:
a phase selection switch configured to selectively couple at least one phase input of the first input to the receptacle, the at least one phase input being configured to receive at least one phase of the multiple phases of first power from the first power source.

5. The ATS system of claim 1 wherein the at least one phase-selection interface includes:
a phase selection switch configured to selectively couple at least one phase input of the first input to the at least one switching device, the at least one phase input being configured to receive at least one phase of the multiple phases of first power from the first power source.

6. The ATS system of claim 1 wherein the at least one phase-selection interface includes:
a phase selection switch configured to selectively couple at least one phase input of the second input to the receptacle, the at least one phase input being configured to receive at least one phase of the multiple phases of second power from the second power source.

7. The ATS system of claim 1 wherein the at least one phase-selection interface includes:
a phase selection switch configured to selectively couple at least one phase input of the second input to the at least one switching device, the at least one phase input being configured to receive at least one phase of the multiple phases of second power.

8. The ATS system of claim 1 wherein the at least one phase-selection interface is configured to switch from outputting the first selected phase of the first power to outputting a third selected phase of the first power, the third selected phase chosen from among the multiple phases of the first power.

9. The ATS system of claim 1 wherein the at least one phase-selection interface is configured to switch from outputting the second selected phase of the second power to outputting a third selected phase of the second power, the third selected phase chosen from among the multiple phases of the second power.

10. The ATS system of claim 1 further comprising:
a multiphase rectifier configured to receive power from one of the first input or the second input; and
a converter coupled to the multiphase rectifier and configured to receive power from the multiphase rectifier, process power received from the multiphase rectifier into processed power, and provide the processed power to the at least one controller.

11. The ATS system of claim 1 wherein a first total number of the multiple phases of first power equals a second total number of the multiple phases of second power, and the ATS system further comprises:
at least one respective receptacle for each respective phase of the first power; and
at least one respective switching device for each respective phase of the first power.

12. A method of transferring power automatically using a switching system having a first input, a second input, at least one phase-selection interface, at least one switching device, and a receptacle, the method comprising:
receiving, at the first input, first power having multiple phases from a first power source;
receiving, by the at least one phase-selection interface, the multiple phases of first power;
selecting, by the at least one phase-selection interface, a first selected phase of first power from the multiple phases of first power;
outputting, by the at least one phase-selection interface, the first selected phase of first power to the at least one switching device;
receiving, at the second input, second power having multiple phases from a second power source;
receiving, by the at least one phase-selection interface, the multiple phases of second power;
selecting, by the at least one phase-selection interface, a second selected phase of second power from the multiple phases of second power;
outputting, by the at least one phase-selection interface, the second selected phase of second power to the at least one switching device;
receiving, by the at least one switching device, the first selected phase of first power and the second selected phase of second power; and
providing, by the at least one switching device, one of the first selected phase of first power or the second selected phase of second power to the receptacle by coupling one of the first input or the second input to the receptacle while decoupling the other of the first input or the second input from the receptacle.

13. The method of claim 12 further comprising providing, by the at least one switching device, the first selected phase of first power to the receptacle.

14. The method of claim 12 further comprising providing, by the at least one switching device, the second selected phase of second power to the receptacle.

15. The method of claim 12 further comprising:
decoupling, by the at least one switching device, the receptacle from the first input responsive to determining that the first power provided via the first input connection falls outside a range of acceptable voltage or current values.

16. The method of claim 12 further comprising:
decoupling, via the at least one switching device, the receptacle from the second input responsive to determining that the second power received at the second input connection falls outside of a range of acceptable voltage or current values.

17. At least one non-transitory computer-readable medium containing thereon instructions executable by at least one processor for controlling an automatic transfer switching system having a first input to receive multiple phases of first power, a second input to receive multiple phases of second power, at least one phase-selection interface to receive the multiple phases of first power and the multiple phases of second power, at least one switching device, and a receptacle, the instructions instructing the at least one processor to:

select a first selected phase of power chosen from among the multiple phases of the first power;

select a second selected phase of power chosen from among the multiple phases of the second power;

control the at least one phase-selection interface to output the first selected phase of power from the multiple phases of first power received by the at least one phase-selection interface, and output the second selected phase of power from the multiple phases of second power received by the at least one phase-selection interface; and control the at least one switching device to provide power to the receptacle, wherein controlling the at least one switching device to provide power to the receptacle includes controlling the at least one switching device to couple the first input to the receptacle to provide the first selected phase of power to the receptacle when the at least one switching device decouples the second input from the receptacle, and controlling the at least one switching device to couple the second input to the receptacle to provide the second selected phase of power to the receptacle when the at least one switching device decouples the first input from the receptacle.

18. The at least one non-transitory computer-readable medium of claim 17 wherein the instructions further instruct the at least one processor to switch from providing the first selected phase of power to providing the second selected phase of power by controlling the at least one switching device to decouple the first input from the receptacle and couple the second input to the receptacle.

19. The at least one non-transitory computer-readable medium of claim 17 wherein the instructions further instruct the at least one processor to control the at least one switching device to decouple the receptacle from the first input responsive to determining that the first power falls outside a range of acceptable voltage or current values.

20. The at least one non-transitory computer-readable medium of claim 17 wherein the instructions further instruct the at least one processor to control the at least one switching device to decouple the receptacle from the second input responsive to determining that the second power falls outside a range of acceptable voltage or current values.

* * * * *